US012782855B2

(12) United States Patent
Ikegami et al.

(10) Patent No.: US 12,782,855 B2
(45) Date of Patent: Nov. 3, 2026

(54) IMAGE FORMING APPARATUS

(71) Applicant: CANON KABUSHIKI KAISHA, Tokyo (JP)

(72) Inventors: Shoichiro Ikegami, Kanagawa (JP); Takaaki Akamatsu, Kanagawa (JP); Toru Imaizumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/658,630

(22) Filed: May 8, 2024

(65) Prior Publication Data

US 2024/0377776 A1 Nov. 14, 2024

(30) Foreign Application Priority Data

May 12, 2023 (JP) ................................ 2023-079031

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
None
See application file for complete search history.

(56) References Cited

U.S. PATENT DOCUMENTS

| | | | | |
|---|---|---|---|---|
| 2015/0234330 A1* | 8/2015 | Nakada | G03G 15/2039 | 399/329 |
| 2015/0338795 A1* | 11/2015 | Yamaguchi | H05B 6/107 | 219/216 |
| 2020/0073300 A1* | 3/2020 | Itoh | G03G 15/2053 | |
| 2020/0272080 A1* | 8/2020 | Seshita | G03G 15/2064 | |
| 2020/0278627 A1* | 9/2020 | Shimada | G03G 15/2053 | |
| 2022/0075302 A1* | 3/2022 | Iwaya | G03G 15/2053 | |
| 2022/0100128 A1* | 3/2022 | Nakamoto | G03G 15/2017 | |
| 2023/0067448 A1* | 3/2023 | Miyashita | G03G 15/2053 | |
| 2023/0266700 A1* | 8/2023 | Honke | G03G 15/2053 | 399/69 |
| 2025/0085651 A1* | 3/2025 | Yamaji | G03G 15/2053 | |

FOREIGN PATENT DOCUMENTS

| | | |
|---|---|---|
| JP | H1184919 A | 3/1999 |
| JP | 2015176030 A | 10/2015 |
| JP | 2015176085 A | 10/2015 |
| JP | 2019074606 A | 5/2019 |

* cited by examiner

*Primary Examiner* — Sevan A Aydin
(74) *Attorney, Agent, or Firm* — Canon U.S.A., Inc. IP Division

(57) ABSTRACT

An image forming apparatus includes a fixing apparatus having first and second rotating members, a heater, and a soaking member. The soaking member includes a first region first region having a fixed width in the widthwise direction, a second region closer to an end-portion side than the first region, and ranging from an end portion of the first region to a position where an end portion of a maximum size recording material conveyable by the fixing apparatus is to pass through, and a third region. The third region is closer to a longitudinal end-portion side than the second region, and ranges from an end portion of the second region to an end portion of the soaking member. Widths of the second and the third regions in the widthwise direction are equal to each other and are smaller than a fixed width of the first region in the widthwise direction.

5 Claims, 13 Drawing Sheets

HEATER AND ALUMINUM PLATE (FIRST EXEMPLARY EMBODIMENT)

50

HEATER AND ALUMINUM PLATE (FIRST COMPARATIVE EXAMPLE)

HEATER AND ALUMINUM PLATE (SECOND COMPARATIVE EXAMPLE)

HEATER AND ALUMINUM PLATE (FIRST EXEMPLARY EMBODIMENT)

POSITIONAL RELATION BETWEEN ELECTRICALLY HEATING RESISTANCE LAYERS AND ALUMINUM PLATE IN CONFIGURATION A

POSITIONAL RELATION BETWEEN ELECTRICALLY HEATING RESISTANCE LAYERS AND ALUMINUM PLATE IN CONFIGURATION B

POSITIONAL RELATION BETWEEN ELECTRICALLY HEATING RESISTANCE LAYERS AND ALUMINUM PLATE IN CONFIGURATION C

POSITIONAL RELATION BETWEEN ELECTRICALLY HEATING RESISTANCE LAYERS AND ALUMINUM PLATE IN CONFIGURATION D

POSITIONAL RELATION BETWEEN ELECTRICALLY HEATING RESISTANCE LAYERS AND ALUMINUM PLATE IN CONFIGURATION E

IMAGE FORMING APPARATUS

BACKGROUND

Field

The present disclosure relates to a fixing apparatus used for copiers, laser printers, and other electrophotographic image forming apparatuses, and to an image forming apparatus using the fixing apparatus.

Description of the Related Art

Conventionally, a film heating type fixing apparatus has been known as an electrophotographic fixing apparatus. As discussed in Japanese Patent Application Laid-Open No. H11-84919, a film heating type fixing apparatus includes a heating member composed of a ceramic substrate and electrically heating resistance layers on the substrate, a fixing film rotating while being heated in contact with the heating member, and a pressure roller for forming a nip portion together with the heating member via the fixing film. A recording material for carrying an unfixed toner image is heated while being pinched and conveyed at the nip portion, and the toner image on the recording material is fixed to the recording material. Japanese Patent Application Laid-Open No. H11-84919 discusses a film heating type fixing apparatus having a heat conduction member on the back surface of a heating member. The apparatus restricts temperature rise at a non-sheet-feed portion (hereinafter referred to as a non-sheet-feed portion temperature rise) when fixing of small-sized sheets is continued.

With the recent increase in the processing speed of image forming apparatuses, there has been a demand for reducing the time duration from a time when a user issues a printing start instruction till a time when the first recording material is discharged (hereinafter this time duration is referred to as first printout time (FPOT)), thus reducing the wait time of the user. During the activation of a fixing apparatus, a temperature rise occurs in the fixing film and pressure roller by the heat energy generated by the heating member. The temperature rise does not occur at the non-heating portions of the heating member at both end portions of the nip portion in the direction perpendicular to the recording material conveyance direction before the heat reaches from the heating element region of the heating member. Accordingly, it takes time until the fixing temperature is reached during the activation of the fixing apparatus. To fix the toner image on the recording material, it is necessary to wait until the temperature of the end portions of the heating element region of the heating member rises to the fixing temperature. Examples of methods for accelerating the temperature rise to reduce the FPOT include a method for extending the electrically heating resistance layers of the heating member and a method for increasing the amount of end-portion heat generation. However, extending the electrically heating resistance layers or increasing the amount of end-portion heat generation may possibly degrade the temperature rise of the non-sheet-feed portion.

SUMMARY

The present disclosure is directed to restricting the non-sheet-feed portion temperature rise and reducing the first printout time (FPOT) in a fixing apparatus.

According to an aspect of the present disclosure, an image forming apparatus includes a fixing apparatus, wherein the fixing apparatus includes a first rotating member, a heater that is elongated, that is disposed in an internal space of the first rotating member, and that includes an electrically heating resistance layer, a second rotating member in contact with an outer circumferential surface of the first rotating member, and configured to form a nip portion for pinching and conveying a recording material together with the heater via the first rotating member, and a soaking member disposed to be in contact with the heater and configured to uniform a temperature distribution of the heater, wherein, at the nip portion, an unfixed image on the recording material is to be fixed to the recording material, wherein, in the heater, a recording material conveyance direction on a plane forming the nip portion is a widthwise direction, and a long side direction perpendicular to the recording material conveyance direction is a longitudinal direction, wherein the soaking member includes a first region, a second region, and a third region, wherein the first region has a fixed width in the widthwise direction, wherein the second region is closer to an end-portion side than the first region, and ranges from an end portion of the first region to a position where an end portion of a maximum size recording material conveyable by the fixing apparatus is to pass through, wherein the third region is closer to a longitudinal end-portion side than the second region, and ranges from an end portion of the second region to an end portion of the soaking member, wherein widths of the second and the third regions in the widthwise direction are smaller than the fixed width of the first region in the widthwise direction, and the widths of the second and the third regions in the widthwise direction are equal to each other, and wherein a length of the second region in the longitudinal direction is 20 millimeters (mm) or more and 40 mm or less.

Further features of the present disclosure will become apparent from the following description of exemplary embodiments with reference to the attached drawings.

DESCRIPTION OF THE EMBODIMENTS

A first exemplary embodiment of the present disclosure will be described below. A configuration of a main body of an image forming apparatus according to the present exemplary embodiment, and a fixing apparatus and a soaking member according to the present exemplary embodiment will be described in detail below.

(Image Forming Apparatus)

Figure 1:
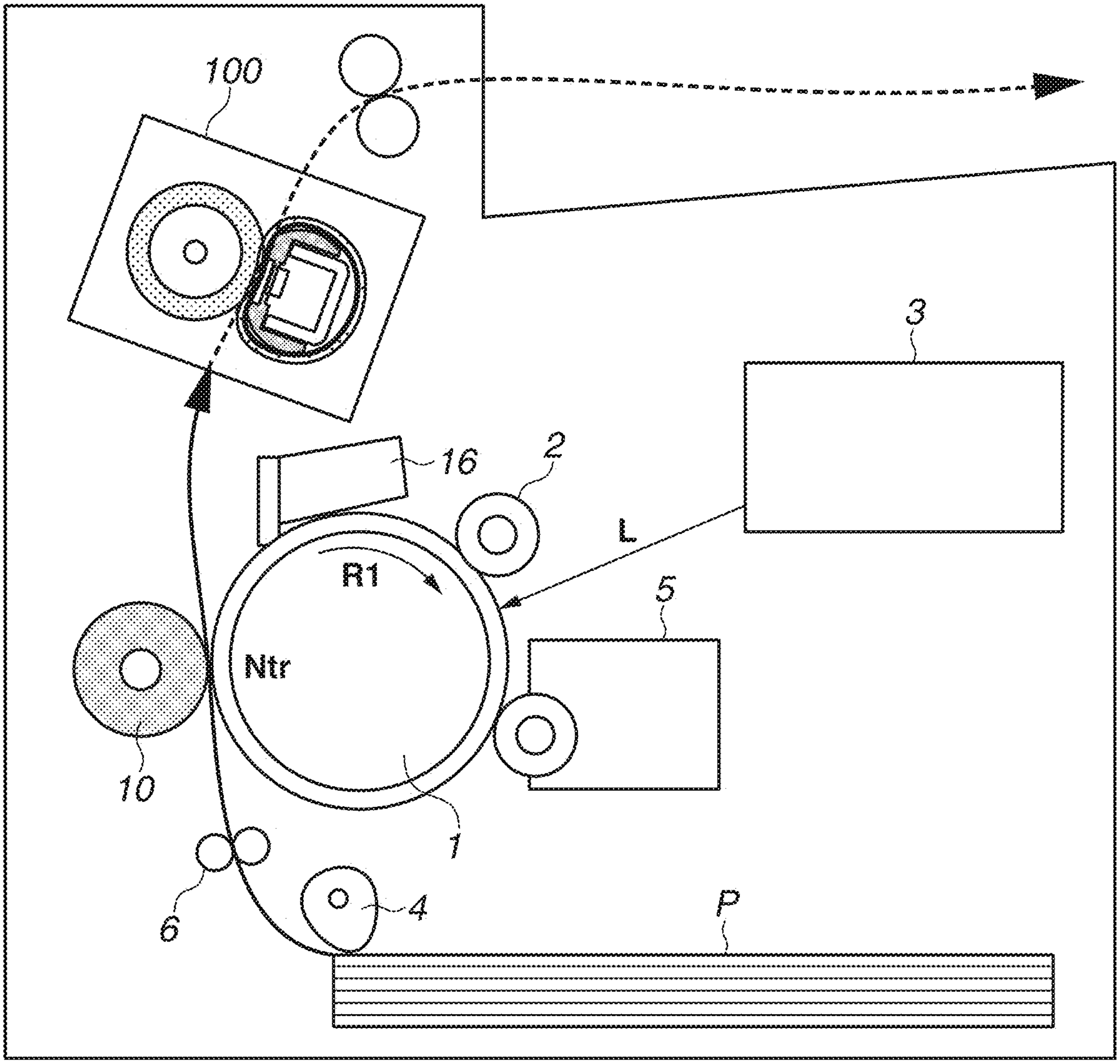
FIG. 1 is a schematic cross-sectional view illustrating a configuration of an image forming apparatus according to a first exemplary embodiment.

An example of an image forming apparatus according to the present exemplary embodiment will be described below with reference to the schematic view illustrated in FIG. 1. An image forming apparatus 50 according to the present exemplary embodiment is an electrophotographic image forming apparatus for directly transferring a toner image on a photosensitive drum 1 onto a recording material P. A charging unit 2, an exposure unit 3 for irradiating the photosensitive drum 1 with a laser beam L, a development unit 5, a transfer roller 10, and a photosensitive drum cleaner 16 are disposed in this order around the circumferential surface of the photosensitive drum 1 along the rotational direction (direction of the arrow R1). The surface of the photosensitive drum 1 is negatively charged by the charging unit 2. The laser beam L of the exposure unit 3 forms an electrostatic latent image on the surface of the charged photosensitive drum 1 (by increasing the surface potential of the exposed portion). According to the present exemplary embodiment, the toner is negatively charged and applied only to the portion of the electrostatic latent image on the photosensitive drum 1 by the development unit 5 storing the toner, and a toner image T is formed on the photosensitive drum 1. The recording material P is fed by the feed roller 4 and then conveyed to a transfer nip portion Ntr by a conveyance roller 6. The transfer roller 10 is applied with a transfer bias with the positive polarity opposite to the charging polarity of the toner by a power source (not illustrated). The toner image T on the photosensitive drum 1 is transferred onto the recording material P at the transfer nip portion Ntr. After the toner image is transferred, transfer residual toner on the surface of the photosensitive drum 1 is removed by a photosensitive drum cleaner 16 having an elastic blade. The recording material P carrying the toner image T is conveyed to a fixing apparatus 100 and the toner image T on the surface is to be heated and fixed.

(Fixing Apparatus)

Figure 2:
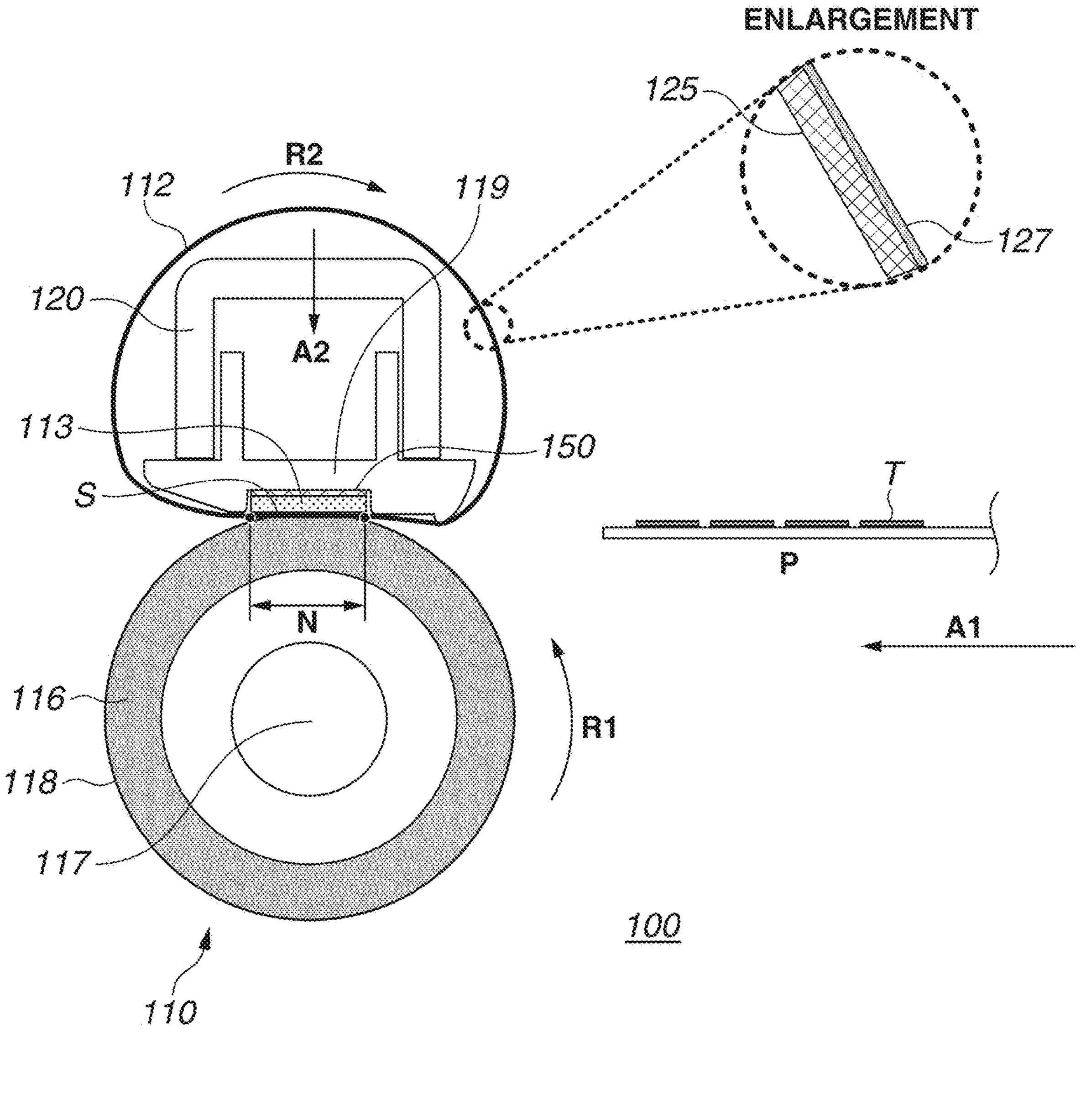
FIG. 2 is a schematic cross-sectional view illustrating a configuration of a fixing apparatus according to the first exemplary embodiment.

The fixing apparatus 100 according to the present exemplary embodiment will be described below. The fixing apparatus 100 according to the present exemplary embodiment is a film heating type fixing apparatus aiming for the above-described activation time reduction and power consumption reduction. FIG. 2 is a cross-sectional view illustrating the fixing apparatus 100 according to the present exemplary embodiment.

In the fixing apparatus 100, an elongated heating member (heater) 113 held by a heating member holder (heater holder) 119 is disposed in an internal space of a flexible first rotating member (fixing film) 112 having a cylindrical shape. The heater 113 in contact with the internal surface of the fixing film 112 heats the inside of the fixing film 112. A second rotating member (pressure roller) 110 in contact with the outer circumferential surface of the fixing film 112, facing the heater 113, forms a fixing nip portion N. When the pressure roller 110 is driven in the direction of the arrow R1 in FIG. 2, the fixing film 112 is supplied with a driving force from the pressure roller 110 at the fixing nip portion N and driven to rotate in the direction of the arrow R2. When the recording material P with the unfixed toner image T transferred thereon is conveyed in the direction of the arrow A1 in FIG. 2 to the fixing nip portion N, the toner image T is fixed to the recording material P. The heater 113 does not need to be in contact with the inner surface of the fixing film 112. For example, a thin plate-like member made of a metal or resin may be provided between the heater 113 and the fixing film 112.

(Fixing Film)

The heater holder 119 holding the heater 113 is supported by an iron stay 120 from the side opposite to the heater 113 to maintain the strength. The flexible fixing film 112 having a cylindrical shape is disposed around the heater holder 119. According to the present exemplary embodiment, the fixing film 112 in a cylindrical shape without deformation has an outer diameter of φ18 millimeters (mm) and a multi-layer structure in the thickness direction. The layer structure of the fixing film 112 includes a base layer 125 for maintaining the film strength, and a mold release layer 127 for reducing the stain adhering to the surface. Because the base layer 125 is subjected to the heat of the heater 113, the base layer 125 needs to have a heat resistance. Because the base layer 125 slides with the heater 113, the base layer 125 also needs to have a strength. Accordingly, examples of preferable materials of the base layer 125 include a metal such as stainless used steel (SUS) and nickel, and a heat-resistant resin such as polyimide. Metals are stronger than resins and therefore are easier to be shaped in a thinner form. In addition, metals have higher heat conductivity than resins and therefore are easier to transfer the heat of the heater 113 to the surface of the fixing film 112. Resins have a smaller specific gravity and smaller heat capacity than metals, and therefore are advantageously easier to be heated. Resins enables thin film forming at a low cost through a coating molding method. According to the present exemplary embodiment, polyimide is used as the material of the base layer 125 of the fixing film 112, with a carbon-base filler added to improve the heat conductivity and strength. The thinner base layer 125 makes it easier to transfer the heat of the heater 113 to the surface of the pressure roller 110 but reduces the strength. Preferably, the base layer 125 has a thickness of about 15 to 100 μm. The thickness is set to 60 μm according to the present exemplary embodiment.

Examples of preferable materials of the mold release layer 127 of the fixing film 112 include fluoro plastics such as tetrafluoroethylene-perfluoroalkyl vinyl ether copolymer (PFA), polytetrafluoroethylene (PTFE), and tetrafluoroethylene-hexafluoropropylene (FEP). A material used in the present exemplary embodiment is PFA having superior mold release characteristics and high heat resistance from among fluoro plastics. The mold release layer 127 may be coated with a tube or applied with surface coating with a coating material. According to the present exemplary embodiment, the mold release layer 127 is formed through coating having superior thin film forming characteristics. The thinner mold release layer 127 makes it easier to transfer the heat of the heater 113 to the surface of the fixing film 112 but exhibits a lower durability. Preferably, the mold release layer 127 has a thickness of about 5 to 30 μm. The thickness is set to 10 μm according to the present exemplary embodiment.

Although not used in the present exemplary embodiment, an elastic layer may be disposed between the base layer 125 and the mold release layer 127. In this case, silicone rubber or fluoro rubber is used as the material of the elastic layer.

(Pressure Roller)

According to the present exemplary embodiment, the pressure roller 110 having an outer diameter of φ20 mm is composed of an iron cored 117 with φ13 mm and an elastic layer 116 made of foam rubber having a thickness of 3.5 mm. The elastic layer 116 is covered by a mold release layer 118 made of PFA as a mold release layer for the toner. Like the mold release layer 127 of the fixing film 112, the mold release layer 118 may be a coated tube or a tube applied with surface coating with a coating material. The present exemplary embodiment uses a tube having a superior durability. Examples of usable materials of the mold release layer 118 include PFA, fluoro plastics such as PTFE and FEP, and fluoro rubber or silicone rubber having superior mold release characteristics. The lower hardness of the pressure roller 110 enables obtaining the widthwise length of the fixing nip portion N with a smaller pressure but exhibits a lower durability. For this reason, according to the present exemplary embodiment, the pressure roller 110 is provided with an Asker-C hardness (4.9 N load) of 50 degrees and a total application pressure of 15 kilogram-force (kgf). The pressure roller 110 is configured to be rotated at a surface moving speed of 240 mm/sec. in the direction of the arrow R1 in FIG. 2 by a rotation unit (not illustrated).

(Heating Member)

Figure 3:
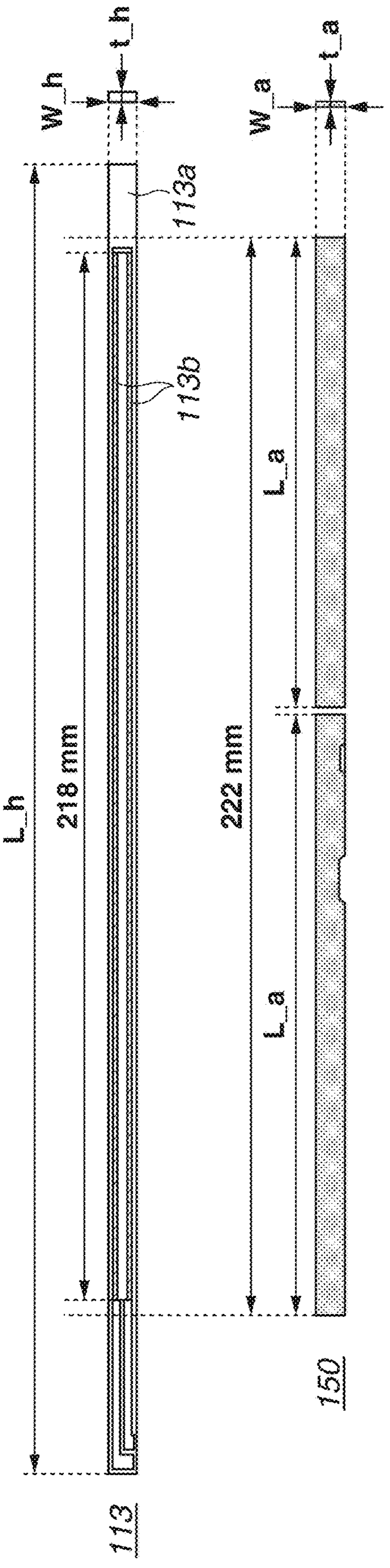
FIG. 3 is a schematic view illustrating dimensions of a heater and an aluminum plate according to a first comparative example.

FIG. 3 is a schematic view illustrating the heating member (heater) 113 and a soaking member (aluminum plate) 150 according to a first comparative example for the descriptions of the dimensions and arrangements. The present exemplary embodiment uses an alumina substrate 113*a* having a rectangular shape with a widthwise length (W_h) of 5.9 mm in the recording material conveyance direction and a longitudinal length (L_h) of 270 mm in the direction perpendicular to the recording material conveyance direction, and having a thickness (t_h) of 1 mm. The surface of the substrate 113*a* is coated with 10-μm electrically heating resistance layers 113*b* made of Ag/Pd (silver palladium) through screen process printing, and the layers 113*b* are covered by glass with a thickness of 60 μm as a heating element protection layer (not illustrated). The maximum recording material width for the image forming apparatus according to the present exemplary embodiment is the letter size. To sufficiently heat the above-described letter-size recording material width 216 mm in the longitudinal direction, the longitudinal length of the electrically heating resistance layers 113*b* is 218 mm which is rightwardly and leftwardly 1-mm longer than the length of the letter size. The resistance value of the electrically heating resistance layers 113*b* is 14 ohms to satisfy the rising performance. The present exemplary embodiment does not partially change the resistance value to locally change the heat generation amount but uniformly generates heat over the entire region.

(Soaking Member)

A soaking member (aluminum plate) 150 transfers and diffuses longitudinal temperature variations due to the non-sheet-feed portion temperature rise to reduce the temperature variations when a small-sized sheet is fed. Although aluminum is used in the present exemplary embodiment, the material needs to have a favorable thermal conductivity and may be copper or silver. The soaking member 150 may be composed of a single component or a plurality of division parts because of the design conveyance. After positioning fittings are fit to the heater holder 119, the aluminum plate 150 is attached onto the heater holder 119 and then the heater 113 is attached onto the heater holder 119. The longitudinal center portion of the heater 113 is supported by the heater holder 119 via the aluminum plate 150, and the longitudinal end portions of the heater 113 are also supported by the heater holder 119 while in contact with the heater holder 119. According to the present exemplary embodiment, each of the two parts of the aluminum plate 150 is provided with a 3-point fitting to the heater holder 119, and the aluminum plate 150 is fit into the heater holder 119. The aluminum plate 150 has a thickness (t_a) of 0.3 mm, a widthwise length (W_a) of 6.0 mm, and a longitudinal length (L_a) of 124 mm and 97 mm. Because the two parts are disposed with a gap of 1 mm, the aluminum plate 150 has a total longitudinal length of 222 mm. The aluminum 150 is disposed on the back side of the electrically heating resistance layers 113*b*. The shapes of the end portions of the aluminum plate 150 characterizing the present exemplary embodiment will be described in detail below.

(Heating Member Holder)

The heating member holder (heater holder) 119 will be described below. As described above, the aluminum plate 150 is attached to the positioning fittings on the heater holder 119, and the heater 113 is attached to the aluminum plate 150 while in contact with the aluminum plate 150. Thus, the heater 113 is retained being fit into the slots on the heater holder 119. Preferably, the heater holder 119 is made of a material having a low heating capacity so that the heat of the heater 113 is hardly lost. In the present exemplary embodiment, liquid crystal polymer (LCP) is used as a heat-resistant resin. A stay 120 is pressed by a pressure spring (not illustrated) in the direction of the arrow A2 illustrated in FIG. 2 from the longitudinal end portions.

(Element and Control)

A temperature detecting element (not illustrated) is disposed on the back surface of the heater 113. The temperature detecting element detects the temperature of the ceramic substrate which rises by the heat of the electrically heating resistance layers 113*b* via the aluminum plate 150. The temperature of the heater 113 is adjusted by suitably controlling the current supplied from the electrode (not illustrated) at the longitudinal end portions to the electrically heating resistance layers 113*b* in response to the signal of the temperature detecting element. Meanwhile, a safety element (not illustrated) is also disposed on the back surface of the heater 113 via the aluminum plate 150. The safety element prevents a firing due to a failure of the temperature detecting element. This firing is caused by a crack of the heater 113 due to an abnormal temperature rise occurring if the heater 113 is kept being supplied with the current in the failure state. According to the present exemplary embodiment, the safety element is a general thermo switch serially connected to the lead wire for supplying the current to the heater 113. The safety element has such a structure that the current to the heater 113 is cut off by the deformation of a bi-metal if the temperature of the safety element (the back surface temperature of the heater 113) reaches 265° C. Even if the temperature detecting element fails and the back surface temperature of the heater 113 reaches 265° C., the safety element cuts off the current to stop the heating of the heater 113, making it possible to prevent a firing due to a crack of the heater 113.

The heat of the heater 113 under the temperature adjustment by the temperature detecting element transmits from the inner surface to the outer surface of the fixing film 112 to heat the surface of the pressure roller 110 via the fixing nip portion N. As described above, when the recording material P with the unfixed toner image T transferred thereon is conveyed to the fixing nip portion N, the heat of the fixing film 112 and the pressure roller 110 transmits to the unfixed toner image T and the recording material P to fix the toner image T to the recording material P. The fixing apparatus according to the present exemplary embodiment is capable of performing printing on an LTR size recording material at a printing speed of 45 prints per minute (ppm).

(Relation Between FPOT and Non-Sheet Feed Portion Temperature Rise)

To reduce the first printout time (FPOT), the activation time of the fixing apparatus 100 needs to be reduced. When the fixing apparatus 100 is activated, the end-portion temperature of the sheet-feed region not reaching the fixing temperature often becomes a speed limiting factor. The material temperature rises when materials are heated by the electrically heating resistance layers 113*b*. However, at both end portions of the sheet-feed region, heat is drawn by the non-heating portion and hence temperature rise is disturbed. As a result, when the fixing apparatus 100 is activated, the longitudinal temperature distribution at the fixing nip portion N decreases at both end portions of the sheet-feed region. This phenomenon is referred to as an end-portion temperature drop.

Examples of measures for improving the end-portion temperature drop include "prolonging the heating period", "extending the longitudinal length of the electrically heating resistance layers 113*b*", and "increasing the amount of end-portion heat generation for the electrically heating resistance layers 113*b*". For the purpose of reducing the FPOT, measures will be taken to extend the longitudinal length of the heating element or increase the amount of end-portion heat generation for the heating element, possibly degrading the non-sheet-feed portion temperature rise.

The non-sheet-feed portion temperature rise refers to a phenomenon where, when the recording material P having a smaller width than the maximum sheet-feed region is fed, the material temperature of the sheet-feed region becomes higher than that of the non-sheet-feed region. This phenomenon may cause a defective image or damage to materials due to the excessively high material temperature. Accordingly, the non-sheet-feed portion temperature rise needs to be prevented.

Examples of measures for preventing the non-sheet-feed portion temperature rise include reducing the longitudinal length of the electrically heating resistance layers 113*b*, reducing the amount of end-portion heat generation for the electrically heating resistance layers 113*b*, and diffusing local temperature rises by the soaking member 150. However, these measures contradict the FPOT reduction.

Features of Present Exemplary Embodiment

Figure 4A:
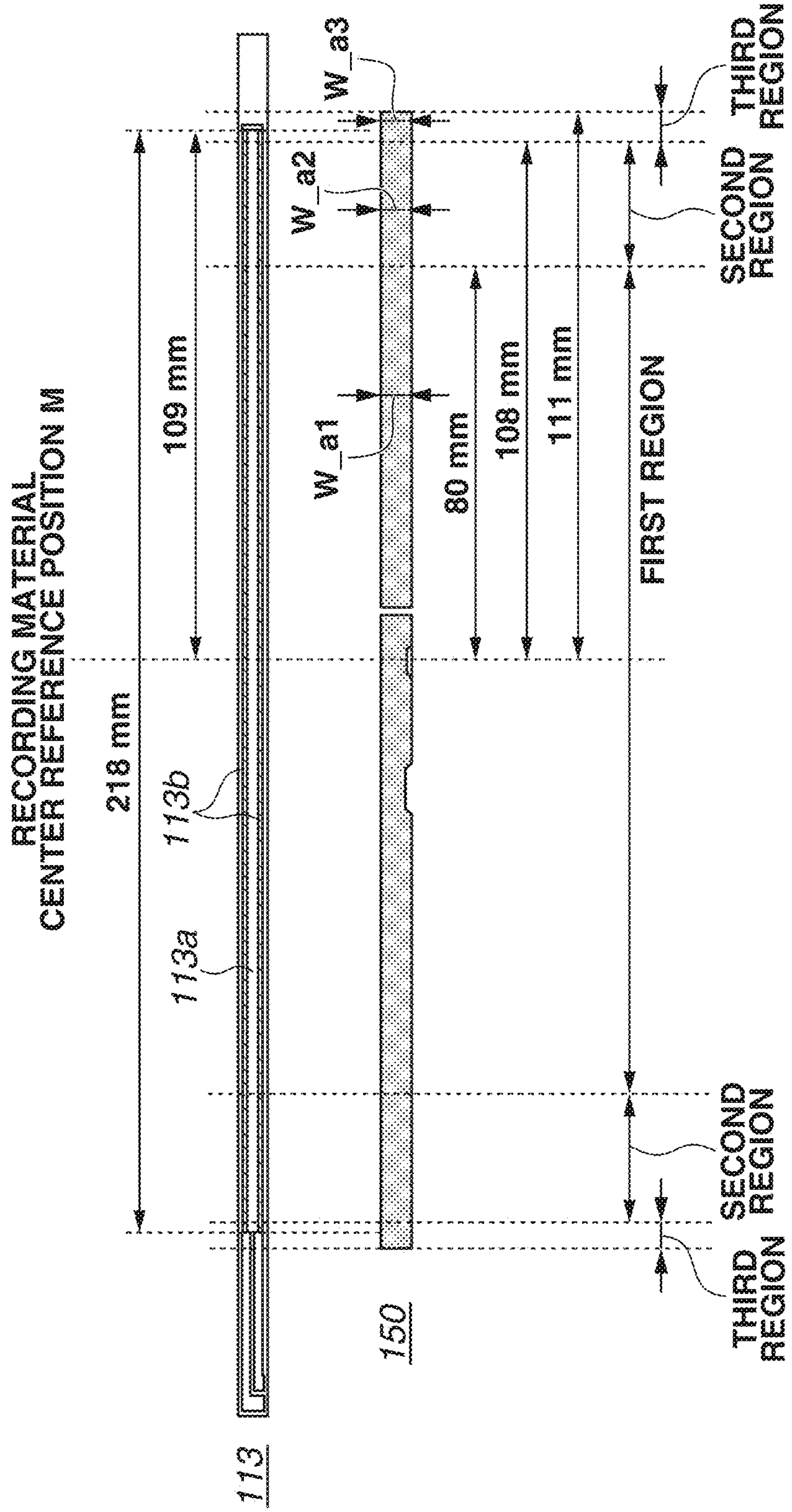
FIGS. 4A, 4B, and 4C are schematic views illustrating the heaters and the aluminum plates according to the first comparative example, a second comparative example, and the first exemplary embodiment.
Figure 4B:
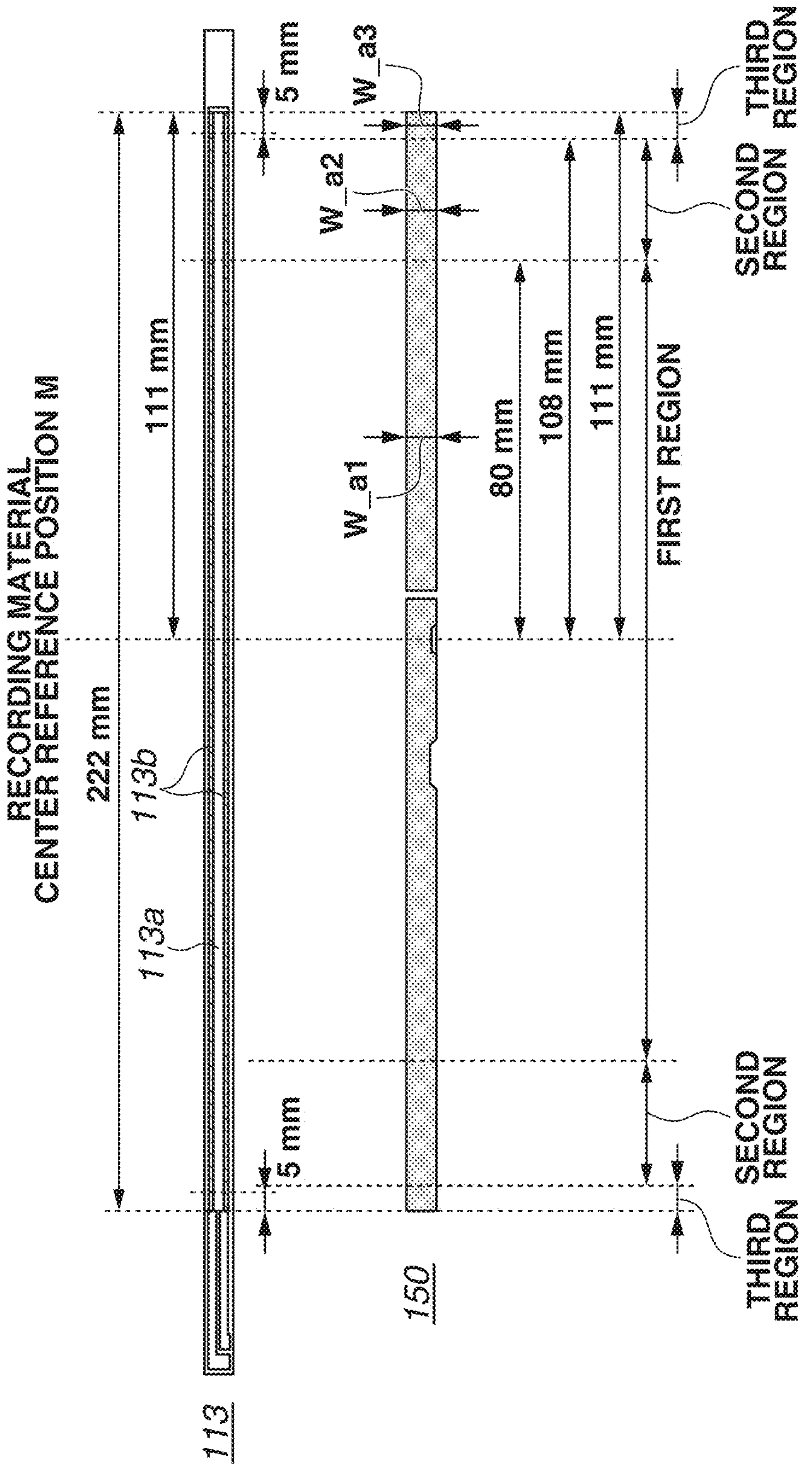
Figure 4C:
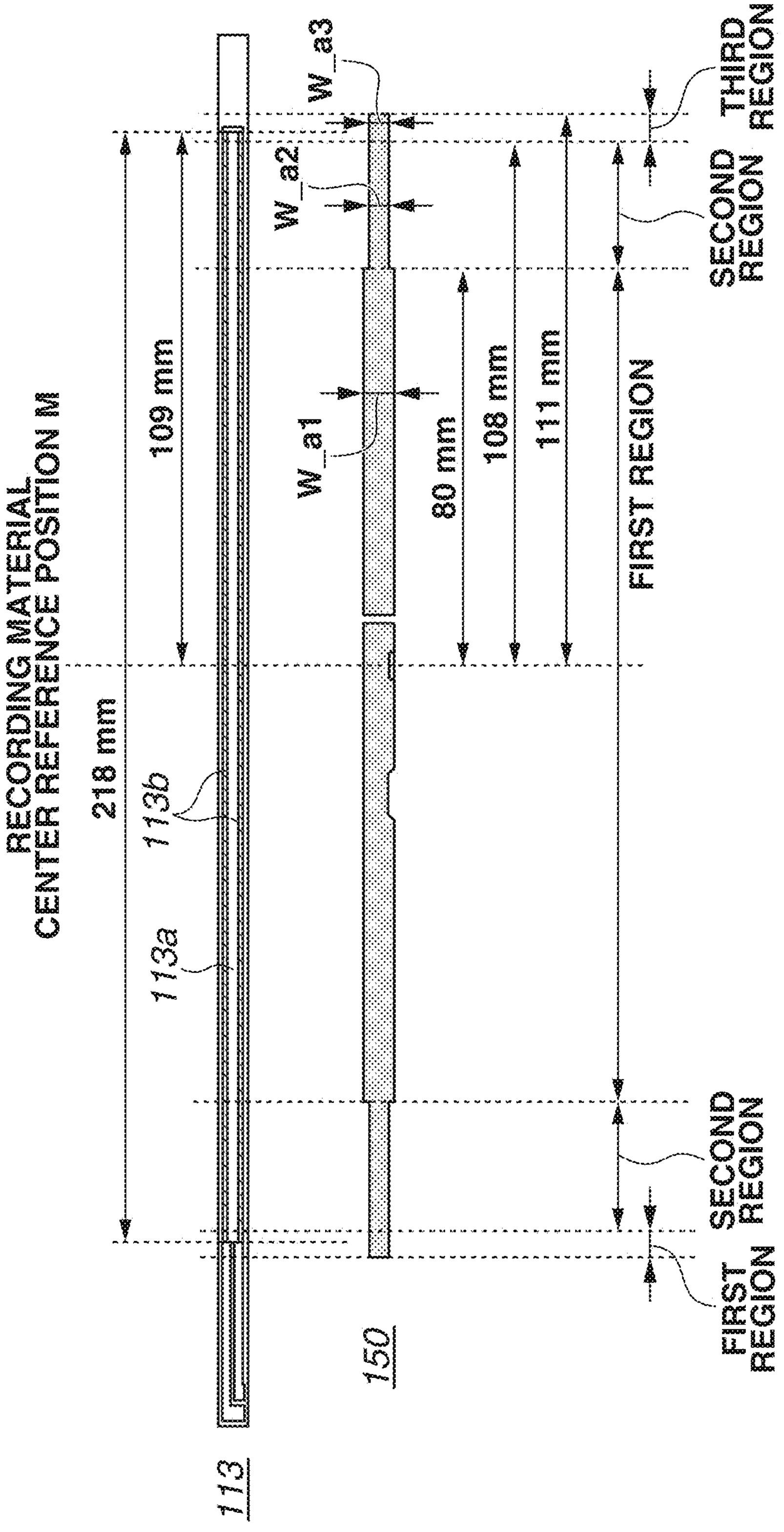

The aluminum plate 150 characterizing the present exemplary embodiment will be described below with reference to FIGS. 4A to 4C. FIG. 4A is a schematic view illustrating a configuration with the aluminum plate 150 and the heater 113 according to the first comparative example. FIG. 4B is a schematic view illustrating a configuration with the changed heating element of the heater 113 (described below) according to a second comparative example. FIG. 4C is a schematic view illustrating a configuration with the aluminum plate 150 and the heater 113 according to the present exemplary embodiment. FIGS. 4A to 4C illustrate definitions of three different regions: a first region where the widthwise length of the aluminum plate 150 is fixed, second regions ranging from an end portion of the first region to a position where an end portion of the maximum size recording material passes through, and third regions ranging from an end portion of a second region to an end portion of the aluminum plate 150. In the first region, no end-portion temperature drop is observed in the activation-time temperature rise process of the fixing apparatus 100. Referring to FIGS. 4A to 4C, the first region ranges from the center reference position M of the recording material to 80 mm positions. A second region ranges from the 80 to 108 mm positions with respect to the center reference position M of the recording material. A third region ranges from the 108 to 111 mm positions with respect to the center reference position M of the recording material. The present exemplary embodiment is characterized in that the widthwise length of the aluminum plate 150 in the second and the third regions is small in comparison with that in the first region. According to the present exemplary embodiment, the first region has a widthwise length (W_a1) of 6.0 mm, the second regions have a widthwise length (W_a2) of 3.9 mm, and the third regions have a widthwise length (W_a3) of 3.9 mm.

Effects of Present Exemplary Embodiment

Comparative evaluations will be performed for the effects on the end-portion temperature drop, the FPOT reduction, and the prevention of the non-sheet-feed portion temperature rise, with reference to the first and the second comparative examples and the present (first) exemplary embodiment. According to the first comparative example, the widthwise length is fixed over the entire region of the aluminum plate 150. According to the second comparative example, as illustrated in FIG. 4B, the electrically heating resistance layers 113*b* of the heater 113 according to the first comparative example have been extended by 2 mm at both longitudinal end portions, providing a total length of 222 mm and a one-side length of 111 mm from the center reference position M and attaining a 10% increase in the heat generation amount at the 5 mm end regions. For each configuration, we performed comparative evaluation on the end-portion temperature drop, comparative evaluation on the FPOT reduction, and comparative evaluation on the restriction of the non-sheet-feed portion temperature rise on the actual apparatus.

[Comparative Evaluations on End-Portion Temperature Drop]

Figure 5:
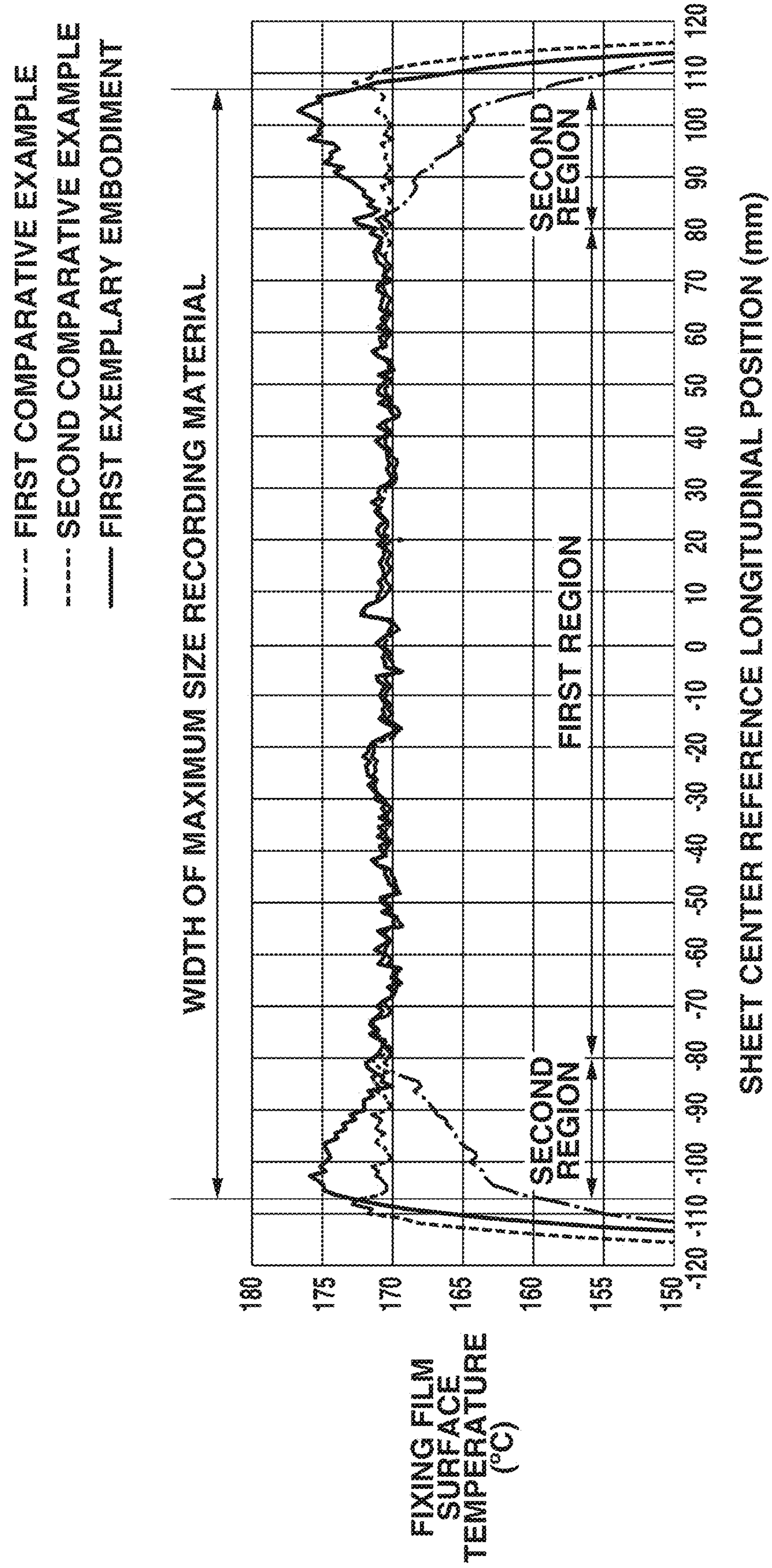
FIG. 5 illustrates results of measurement of end-portion temperature drops according to the first comparative example, the second comparative example, and the first exemplary embodiment.

After heating and rotation operations in a state where the fixing apparatus 100 is cooled down to room temperature, we measured the longitudinal temperature distribution and performed the comparative evaluations. Under conditions of 23° C. ambient temperature, 50% humidity, and 1,000W power supply to the heater 113, we measured the longitudinal temperature distribution on the surface of the fixing film at 4.8 seconds after issuing a printing start instruction, by using a thermo viewer. Results of the measurement are illustrated in FIG. 5.

According to the first comparative example, the temperature linearly drops from the boundary positions between the first and the second regions. At the boundary positions between the second and the third regions where the end portions of the maximum size recording material pass through, the surface temperature of the fixing film is 13° C. lower than that in the first region. According to the present example, the positions at about 28 mm inward from the positions where the end portions of the maximum size recording material pass through are determined as the starting positions of the end-portion temperature drop. However, the starting positions inwardly shift with increasing thickness and heat capacity of the fixing film and outwardly shift with decreasing thickness and heat capacity thereof. According to the experiment, the starting positions of the end-portion temperature drop are within ranges of 20 to 40 mm inward from the positions where the end portions of the maximum size recording material pass through.

The improvement in the end-portion temperature drop can be expected by setting the length of the second regions (the length from the boundaries between the first and the second regions at which the reduction of the widthwise length of the aluminum plate 150 is started to the position where the end portions of the maximum size recording material pass) to the ranges of 20 to 40 mm depending on the thickness and heat capacity of the fixing film.

The second comparative example has improved the influence of the end-portion temperature drop by extending the electrically heating resistance layers 113*b* to increase the amount of end-portion heat generation. The present (first) exemplary embodiment has remarkably improved the end-portion temperature drop. The surface temperature of the fixing film in the first region is higher than that in the second regions.

[Comparative Evaluations on FPOT]

With the image forming apparatus 50, we started a printing operation in a state where the fixing apparatus 100 is cooled down to room temperature, changed the time from the start of a printing operation till one printed sheet is discharged (time till discharge) in 0.1-second steps, and performed image evaluation by printing the entire surface of the recording material black. This evaluation confirms whether the image is favorable by changing the time till discharge regardless of whether the temperature has reached a level high enough for the fixing unit to perform image forming. Changing the time till discharge will change the pre-rotation heating time of the fixing apparatus 100. Although usability increases with decreasing pre-rotation heating time, insufficient temperature rise will cause a fixing failure. We performed the image evaluation by using Canon Multi-Purpose Paper Letter Size 20 lb under conditions of 23° C. ambient temperature, 50% humidity, and 1,000W power supply to the heater 113. Table 1 illustrates results of the evaluations, where x denotes an image separation, A denotes a slight image separation, and o denotes a favorable image.

TABLE 1

Results of comparative evaluations on FPOT (first exemplary embodiment)

| | Time till discharge (seconds) | | | | | | |
|---|---|---|---|---|---|---|---|
| | 5.5 | 5.6 | 5.7 | 5.8 | 5.9 | 6.0 | 6.1 |
| First comparative example | x | x | x | Δ | Δ | ○ | ○ |
| Second comparative example | x | Δ | Δ | ○ | ○ | ○ | ○ |
| First exemplary embodiment | x | Δ | Δ | ○ | ○ | ○ | ○ |

According to the first comparative example, the time till discharge (the time until a sheet is discharge in a favorable image condition, or the FPOT) is at least 6.0 seconds. According to the second comparative example and the present (first) exemplary embodiment, the time can be improved to 5.8 seconds. According to the first comparative example, an image separation notably appears at both end portions of the recording material P in the direction perpendicular to the recording material conveyance direction. When the time till discharge is set to 5.8 or 5.9 seconds, an image separation arises only at both end portions. This is because the fixing temperature is not reached because of the end-portion temperature drop. According to the second comparative example and the present (first) exemplary embodiment, as clarified in the above-described comparative evaluations, the FPOT can be reduced because the end-portion temperature drop has been improved.

[Comparative Evaluations on Non-Sheet-Feed Portion Temperature Rise]

We performed the comparative evaluations on the non-sheet-feed portion temperature rise by measuring and comparing the highest temperature of the surface of the fixing film 112 in a state where 200 A4-size 128-g/m2 grammage NPI high-quality sheets (Canon order sheets made by Nippon Paper Industries Co., Ltd.) are continuously printed at the maximum throughput. During the printing, the sheets are shifted to one side with the sheet width regulation plate of the sheet feed tray of the image forming apparatus 50 spread to the maximum extent. Table 2 illustrates results of the evaluations on the non-sheet-feed portion temperature rise in different configurations.

TABLE 2

Results of comparative evaluations on non-sheet-feed portion temperature rise (first exemplary embodiment)

| | Non-sheet-feed portion temperature rise (° C.) |
|---|---|
| First comparative example | 230 |
| Second comparative example | 257 |
| First exemplary embodiment | 242 |

As for the non-sheet-feed portion temperature rise, the second comparative example, in which the end-portion temperature drop has been improved by extending the length of the electrically heating resistance layers 113*b*, exhibits a significant degradation as an increase of as large as 27° C. in comparison with the first comparative example. On the other hand, the present (first) exemplary embodiment exhibits a degradation as an increase of only 12° C. in comparison with the first comparative example. This means that the non-sheet-feed portion temperature rise has been remarkably improved in comparison with the second comparative example.

[Action Mechanism]

An action mechanism according to the presently proposed method will be described in detail below.

The end-portion temperature drop is one speed-limiting factor in reducing the time till discharge (the time until a sheet is discharged in a favorable image condition). At both longitudinal end portions of the electrically heating resistance layers 113*b* of the heater 113, heat is drawn by non-heat-source portions on the end-portion sides, and therefore the temperature is more likely to drop than the longitudinal center portion. This causes the end-portion temperature drop as a phenomenon notably appearing in the activation process from the cool-down state. The flow of a thermal energy Q generated in the electrically heating resistance layers 113*b* is roughly divided into two different heat fluxes. One heat flux is a heat flux Q1 flowing on the side of the pressure roller 110 in the direction perpendicular to the plane of the heater 113, and the other heat flux is a heat flux Q2 flowing on the side of the heater holder 119. Because the sum of the heat fluxes Q1 and Q2 is constant, the heat flux Q1 increases with decreasing heat flux Q2. In the configuration where the aluminum plate 150 is disposed on the back surface of the heater 113, the heat flux Q2 inwardly flowing from the heater 113 to the heater holder 119 via the aluminum plate 150 can be controlled by changing the shape of the aluminum plate 150.

The inwardly flowing heat flux Q2 is limited by decreasing the widthwise length of the aluminum plate 150 at the longitudinal end portions. Because the sum of the heat fluxes Q1 and Q2 is constant, the outwardly flowing heat flux Q1 increases with decreasing widthwise length to cancel the temperature rise loss due to the end-portion temperature drop.

The non-sheet-feed portion temperature rise refers to a phenomenon where the material temperature is changed by the presence or absence of the recording material P in the region of the electrically heating resistance layers 113*b*. The aluminum plate 150 having a high heat conductivity exerts an action of smoothing the longitudinal temperature variations through heat transport. The heat transport amount depends on the cross section area of the aluminum plate 150 and the existence of a heat flow destination. The non-sheet-feed portion temperature rise occurs when a small-sized recording material smaller than the maximum size recording material is fed, and a temperature peak arises approximately at the center of the non-sheet-feed region. Accordingly, when A4-size sheets shifted to one side are fed, a peak of the non-sheet-feed portion temperature rise occurs at the 105-mm position with respect to the sheet center position according to the first comparative example and the present (first) exemplary embodiment, and at the 106-mm position according to the second comparative example. The temperature of the aluminum plate 150 also becomes highest at the peak position of the non-sheet-feed portion temperature rise. In the sheet-feed region, the temperature is controlled to be constantly maintained low because heat is drawn by the recording material supplied as required and an unfixed image. Accordingly, most of the heat transport amount in the aluminum plate 150 flows from the non-sheet-feed region to the sheet-feed region. As for the cross section area of the aluminum plate 150, the second comparative example is equivalent to the first comparative example, and the present (first) exemplary embodiment exhibits a 65% decrease with respect to the first comparative example. Meanwhile, for the non-sheet-feed portion temperature rise, the second comparative example exhibits a degradation as an increase of as large as 27° C., and the present (first) exemplary embodiment exhibits a degradation as an increase of only 12° C. This means that, to achieve the equivalent FPOT, the end-portion shape deformation of the aluminum plate 150 is more advantageous than the extension of the length of the electrically heating resistance layers 113*b* and the increase in the amount of end-portion heat generation.

As described above, changing the end-portion shapes of the aluminum plate 150 enables improving the end-portion temperature drop during the activation, achieving the FPOT reduction while restricting the degradation degree of the non-sheet-feed portion temperature rise.

The second exemplary embodiment of the present disclosure will be described below. The second exemplary embodiment differs from the first exemplary embodiment in the configuration related to the shape of the aluminum plate 150. Other configurations are similar to those according to the first exemplary embodiment, and detailed descriptions of the image forming apparatus and the fixing apparatus will be omitted.

Features of Present Exemplary Embodiment

Figure 6:
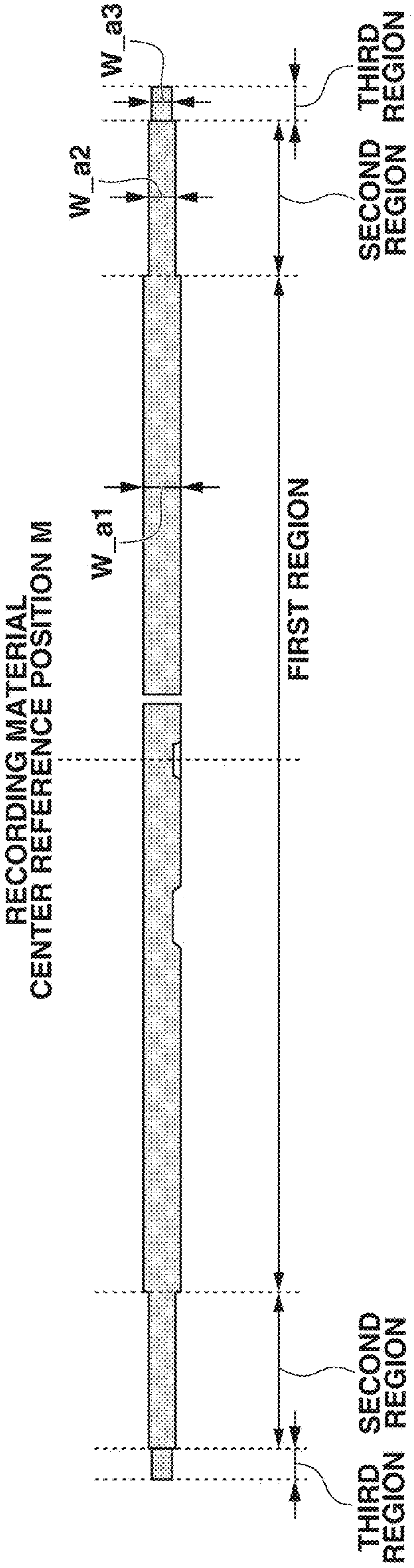
FIG. 6 is a schematic view illustrating an aluminum plate according to a second exemplary embodiment.

The shape of the aluminum plate 150 characterizing the present exemplary embodiment will be described below with reference to FIG. 6. The present (second) exemplary embodiment is characterized in that the widthwise length of the aluminum plate 150 in the second regions is smaller than that in the first region and that the widthwise length thereof in the third regions is smaller than that in the second regions. According to the present (second) exemplary embodiment, the first region has a widthwise length (W_a1) of 6.0 mm, the second regions have a widthwise length (W_a2) of 4.2 mm, and the third regions have a widthwise length (W_a3) of 3.8 mm. Only the second regions may partly include a portion having a smaller widthwise length. In the second regions, the widthwise length of the aluminum plate 150 is not limited to be constant. The widthwise length may be tapered to gradually increase from the first region toward the third regions.

Effects of Present Exemplary Embodiment

To confirm the effects of the configuration of the present (second) exemplary embodiment, we performed comparative evaluation on the end-portion temperature drop, comparative evaluation on the FPOT, and comparative evaluation on the non-sheet-feed portion temperature rise, according to similar procedures to the first exemplary embodiment.

Figure 7:
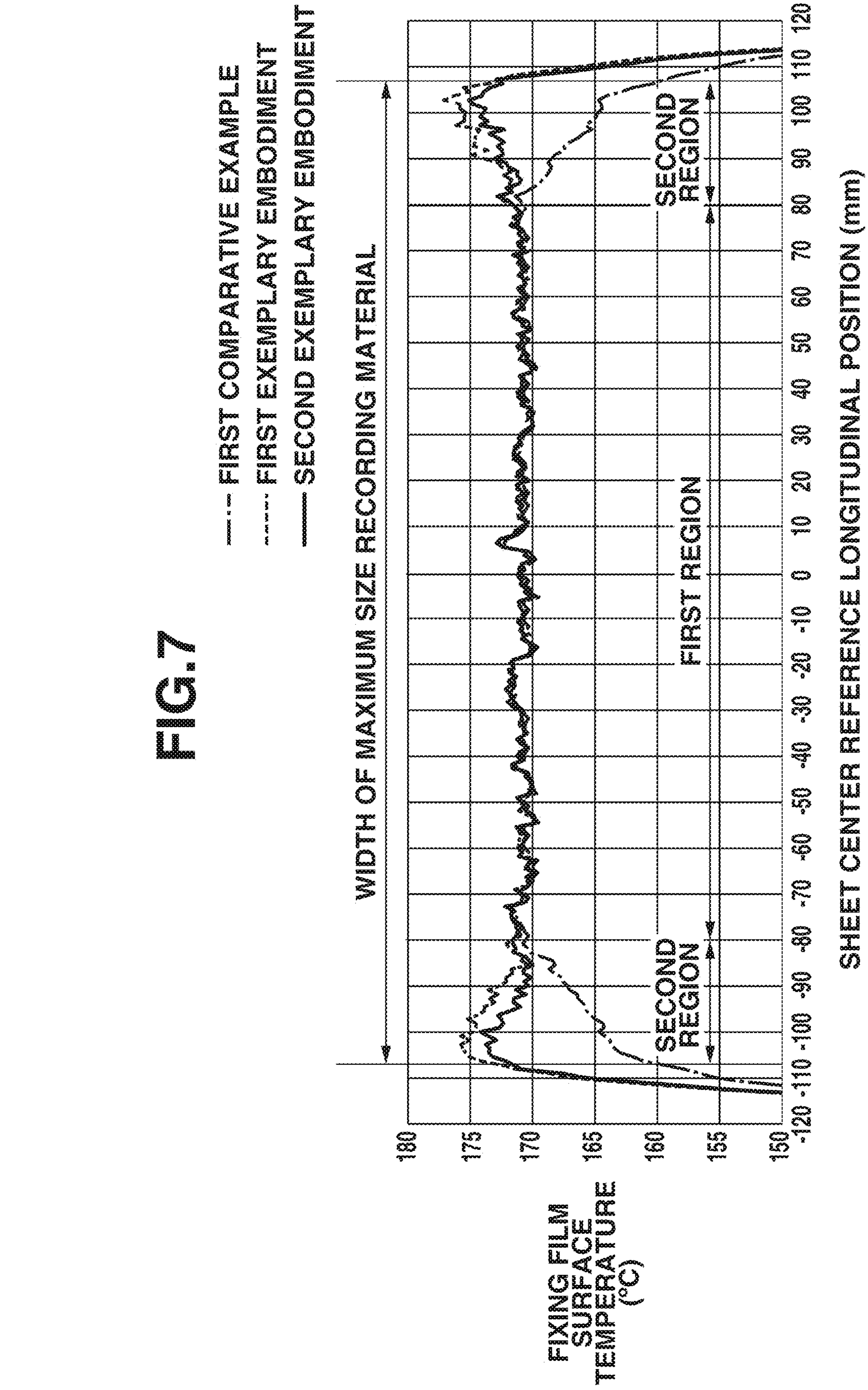
FIG. 7 illustrates results of measurement of end-portion temperature drops according to the first comparative example, the first exemplary embodiment, and the second exemplary embodiment.

FIG. 7 illustrates results of the comparative evaluations on the end-portion temperature drop. According to the first comparative example, the end-portion temperature drop is observed in the first, second, and third regions. According to the first exemplary embodiment, an excessive temperature rise exceeding the temperature in the first region is observed in the second regions. According to the second exemplary embodiment, the excessive temperature rise in the second regions is restricted.

Table 3 illustrates results of the comparative evaluations on the FPOT, and Table 4 illustrates results of the comparative evaluations on the non-sheet-feed portion temperature rise.

TABLE 3

Results of comparative evaluations on FPOT (second exemplary embodiment)

| | Time till discharge (seconds) | | | | | | |
|---|---|---|---|---|---|---|---|
| | 5.5 | 5.6 | 5.7 | 5.8 | 5.9 | 6.0 | 6.1 |
| First comparative example | x | x | x | Δ | Δ | ○ | ○ |
| First exemplary embodiment | x | Δ | Δ | ○ | ○ | ○ | ○ |
| Second exemplary embodiment | x | Δ | Δ | ○ | ○ | ○ | ○ |

TABLE 4

Results of comparative evaluations on non-sheet-feed portion temperature rise (second exemplary embodiment)

| | Non-sheet-feed portion temperature rise (° C.) |
|---|---|
| First comparative example | 230 |
| First exemplary embodiment | 242 |
| Second exemplary embodiment | 235 |

During the activation, the fixing characteristics at the end portions of the maximum size recording material become a speed-limiting factor. According to the present (second) exemplary embodiment in which the end-portion temperature drop has been improved, the time till discharge (the time until a sheet is discharged in a favorable image condition like the first exemplary embodiment, or the FPOT) is 0.2-second shorter than that according to the first comparative example. As for the non-sheet-feed portion temperature rise, the first exemplary embodiment exhibits a degradation as an increase of 12° C., and the present (second) exemplary embodiment exhibits an improved degradation as an increase of as small as 5° C. When A4-size sheets shifted to one side are fed, a peak of the non-sheet-feed portion temperature rise occurs at the 105-mm position with reference to the sheet center position. After the sheet feeding, a heat transport by the aluminum plate 150 takes place relative to the first region having relatively low temperature. The heat transport capacity for smoothing the non-sheet-feed portion temperature rise depends on the cross section area of the aluminum plate 150. For this reason, the first exemplary embodiment exhibits a 65% heat transport capacity in comparison with the first comparative example whereas the present (second) exemplary embodiment exhibits a 70% heat transport capacity, thus improving the non-sheet-feed portion temperature rise.

As described above, changing the end-portion shapes of the aluminum plate 150 enables improving the end-portion temperature drop during the activation, achieving the FPOT reduction while restricting the degradation of the non-sheet-feed portion temperature rise. Processing of the aluminum plate 150 can be facilitated by gradually decreasing the widthwise length of the aluminum plate 150 over the ranges from the first region toward the third regions.

A third exemplary embodiment of the present disclosure will be described below. The third exemplary embodiment differs from the first and the second exemplary embodiments in the configuration related to the shape of the aluminum plate 150. Other configurations are similar to those according to the first and the second exemplary embodiments, and detailed descriptions of the image forming apparatus and the fixing apparatus will be omitted.

Features of Present Exemplary Embodiment

Figure 8:
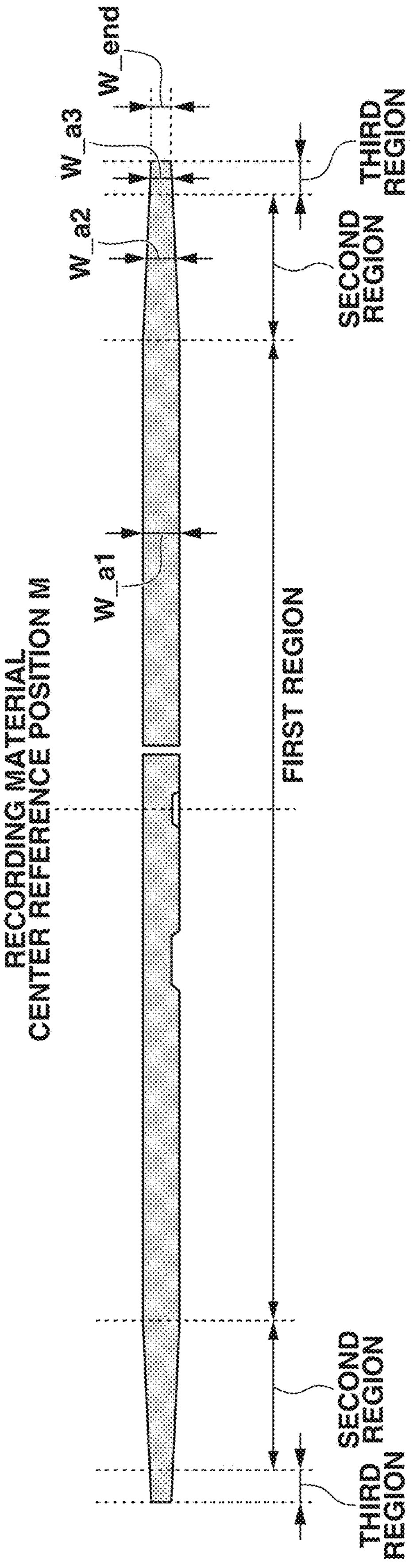
FIG. 8 is a schematic view illustrating an aluminum plate according to a third exemplary embodiment.

The shape of the aluminum plate 150 characterizing the present exemplary embodiment will be described below with reference to FIG. 8. The present (third) exemplary embodiment is characterized in that the widthwise length of the aluminum plate 150 continuously decreases over the ranges from the second regions toward the farthest end portions of the third regions with respect to the widthwise length of the first region. According to the present (third) exemplary embodiment, the first region has a widthwise length (W_a1) of 6.0 mm, the third regions have a farthest end-portion widthwise length (W_end) of 3.7 mm, and the widthwise length linearly decreases in ranges from the end portions of the first region toward the farthest end portions of the third regions.

Effects of Present Exemplary Embodiment

To confirm the effects of the configuration of the present (third) exemplary embodiment, we performed comparative evaluation on the end-portion temperature drop, comparative evaluation on the FPOT, and comparative evaluation on the non-sheet-feed portion temperature rise, according to similar procedures to those of the first and the second embodiments.

Figure 9:
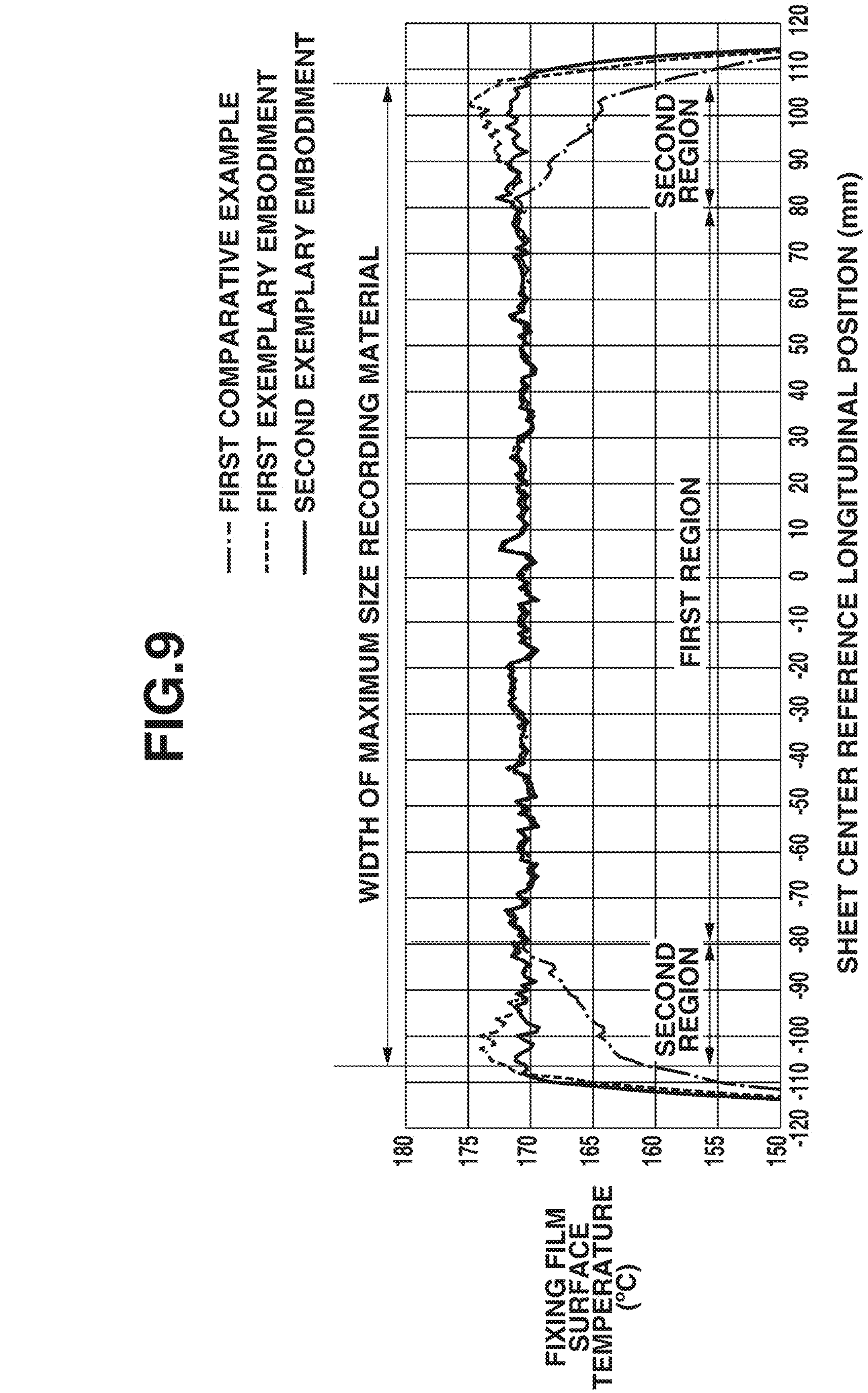
FIG. 9 illustrates results of measurement of end-portion temperature drops according to the first comparative example, the second exemplary embodiment, and the third exemplary embodiment.
Figure 10A:
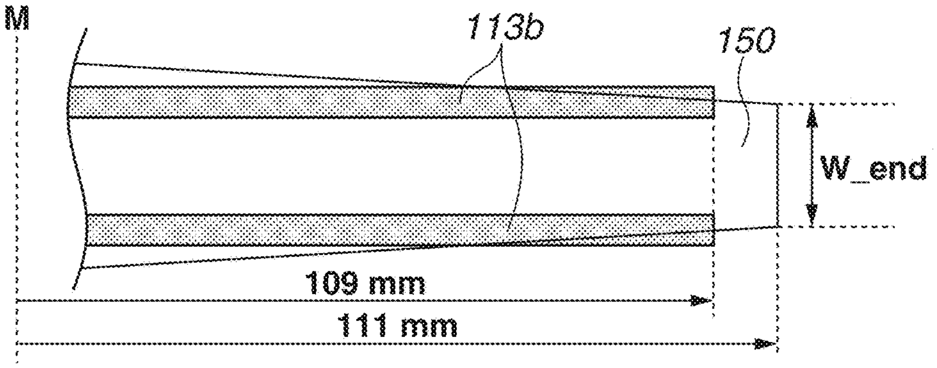
FIGS. 10A to 10E are schematic views illustrating positional relations between electrically heating resistance layers and aluminum plates according to configurations A to E.
Figure 10B:
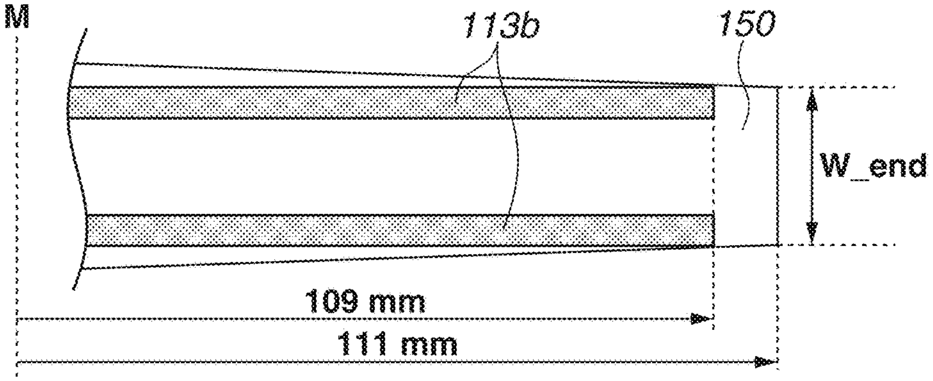
Figure 10C:
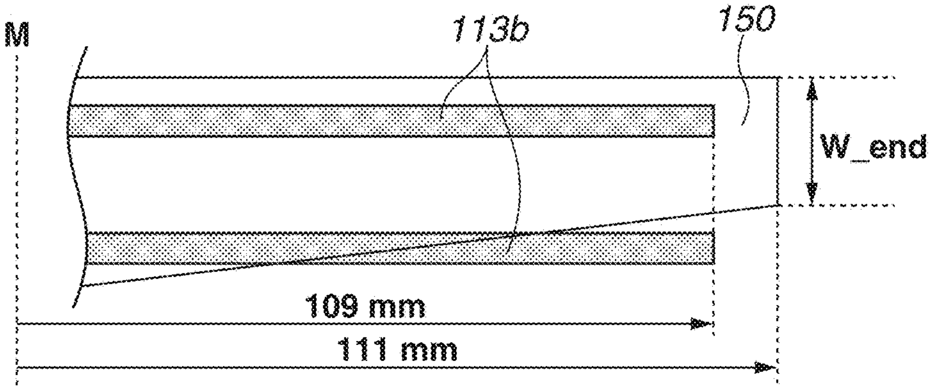
Figure 10D:
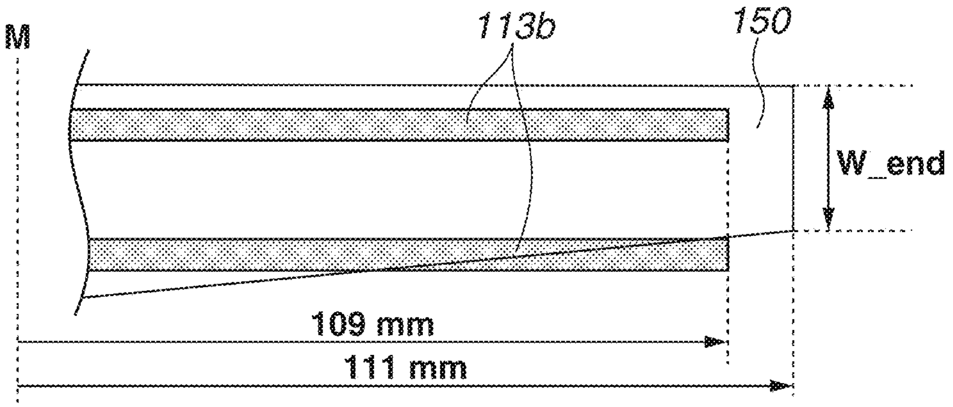
Figure 10E:
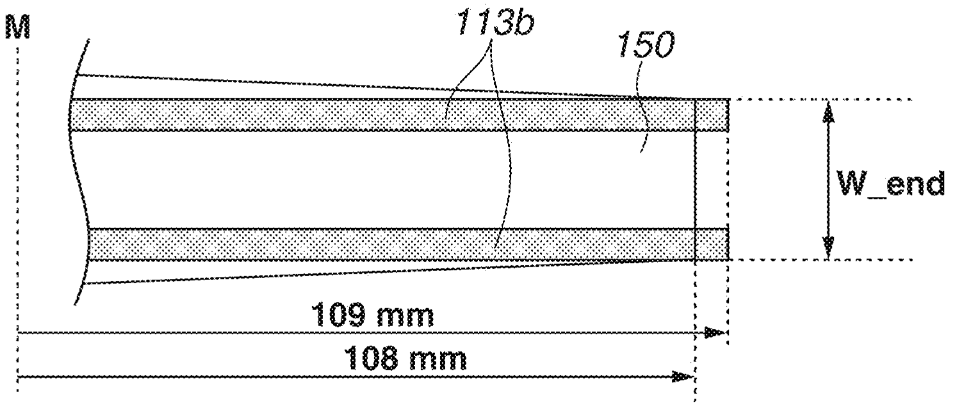

FIG. 9 illustrates results of the comparative evaluations on the end-portion temperature drop. According to the first comparative example, the end-portion temperature drop is observed in the second and the third regions. According to the second exemplary embodiment, an excessive temperature rise exceeding the temperature in the first region is observed in the second regions. According to the third exemplary embodiment, a uniform temperature distribution is observed in the first and the second regions where the maximum size recording material passes through.

Table 5 illustrates results of the comparative evaluations on the FPOT, and Table 6 illustrates results of the comparative evaluations on the non-sheet-feed portion temperature rise.

TABLE 5

Results of comparative evaluations on FPOT (third exemplary embodiment)

| | Time till discharge (seconds) | | | | | | |
|---|---|---|---|---|---|---|---|
| | 5.5 | 5.6 | 5.7 | 5.8 | 5.9 | 6.0 | 6.1 |
| First comparative example | x | x | x | Δ | Δ | ○ | ○ |
| Second exemplary embodiment | x | Δ | Δ | ○ | ○ | ○ | ○ |
| Third exemplary embodiment | x | Δ | Δ | ○ | ○ | ○ | ○ |

TABLE 6

Results of comparative evaluations on non-sheet-feed portion temperature rise (third exemplary embodiment)

| | Non-sheet-feed portion temperature rise (° C.) |
|---|---|
| First comparative example | 230 |
| Second exemplary embodiment | 235 |
| Third exemplary embodiment | 231 |

According to the present (third) exemplary embodiment in which the end-portion temperature drop has been improved, the time till discharge (the time until a sheet is discharged in a favorable image condition like the first and the second exemplary embodiments, or the FPOT) is 0.2-second shorter than that according to the first comparative example. As for the non-sheet-feed portion temperature rise, the second exemplary embodiment exhibits a degradation as an increase of 8° C., and the present (third) exemplary embodiment exhibits an improvement equivalent to the first comparative example. When A4-size sheets shifted to one side are fed, the non-sheet-feed portion temperature rise is maximized at the 105-mm position with reference to the sheet center position. The widthwise length of the aluminum plate 150 at this position is the same according to the second and the third exemplary embodiments. However, according to the present exemplary embodiment in which the widthwise length increases on the longitudinal inner side, the heat transport capacity increases in moving the non-sheet-feed portion temperature rise occurring at the end portions to the sheet-feed region having comparatively low temperature, thus improving the non-sheet-feed portion temperature rise.

As described above, changing the end-portion shapes of the aluminum plate 150 enables improving the end-portion temperature drop during the activation, achieving the FPOT reduction while restricting the degradation of the non-sheet-feed portion temperature rise.

A fourth exemplary embodiment of the present disclosure will be described below. The fourth exemplary embodiment differs from the first, the second, and the third exemplary embodiments in the configuration related to the shape of the aluminum plate 150. Other configurations are similar to those according to the first, the second, and the third exemplary embodiments, and detailed descriptions of the image forming apparatus and the fixing apparatus will be omitted.

Features of Present Exemplary Embodiment

The shape of the aluminum plate 150 characterizing the present exemplary embodiment will be described below with reference to FIGS. 10A to 10E. FIGS. 10A to 10E illustrate the positional relation between the electrically heating resistance layers 113*b* and the aluminum plate 150 at both end portions of the aluminum plate 150, which is essential for improving the end-portion temperature drop. In the configuration A in FIG. 10A according to the third exemplary embodiment, when viewed along the normal direction to the plane formed of the recording material conveyance direction and the longitudinal direction, the farthest end-portion widthwise length (W_end) of the aluminum plate 150 is 3.7 mm, and the electrically heating resistance layers 113*b* protrude from the existence region of the aluminum plate 150 at its end portions. In the configuration B in FIG. 10B, the electrically heating resistance layers 113*b* do not protrude from the existence region of the aluminum plate 150 at its end portions, and the farthest end-portion widthwise length (W_end) is 4.6 mm. In the configuration C in FIG. 10C, the farthest end-portion widthwise length (W_end) of the aluminum plate 150 is 3.7 mm which is the same as that according to the third exemplary embodiment. The widthwise length is reduced only on one side. In the configuration D in FIG. 10D as a form of the present (fourth) exemplary embodiment, the farthest end-portion widthwise length (W_end) of the aluminum plate 150 is 4.2 mm which is larger than that in the configuration C. In the configuration E in FIG. 10E as a form of the present (fourth) exemplary embodiment, the farthest end-portion widthwise length (W_end) of the aluminum plate 150 is 4.4 mm, and the electrically heating resistance layers 113*b* protrude from the existence region of the aluminum plate 150 because of the reduced longitudinal length.

Effects of Present Exemplary Embodiment

To confirm the effects of the configuration according to the present (fourth) exemplary embodiment, we performed comparative evaluation on the end-portion temperature drop, comparative evaluation on the FPOT, comparative evaluation on the non-sheet-feed portion temperature rise, according to similar procedures to the first and the second embodiments. Table 7 illustrates results of these evaluations.

TABLE 7

Results of comparative evaluations (fourth exemplary embodiment)

| | Time till discharge (seconds) | | | | | | | Non-sheet-feed portion temperature |
|---|---|---|---|---|---|---|---|---|
| | 5.5 | 5.6 | 5.7 | 5.8 | 5.9 | 6.0 | 6.1 | rise (° C.) |
| First comparative example | x | x | x | Δ | Δ | ○ | ○ | 230 |
| Configuration A | x | Δ | Δ | ○ | ○ | ○ | ○ | 231 |
| Configuration B | x | x | Δ | Δ | ○ | ○ | ○ | 230 |
| Configuration C | Δ | Δ | ○ | ○ | ○ | ○ | ○ | 233 |
| Configuration D | x | Δ | Δ | ○ | ○ | ○ | ○ | 230 |
| Configuration E | x | Δ | Δ | ○ | ○ | ○ | ○ | 230 |

The configuration B provides an effect of a slight improvement in the end-portion temperature drop and exhibits a degraded result of the time till discharge (the time until a sheet is discharged in a favorable image condition, or the FPOT) in comparison with the configuration A (third exemplary embodiment). However, the configuration B provides an equivalent non-sheet-feed portion temperature rise to the first comparative example. The configuration C provides a larger effect of an improvement in the end-portion temperature drop than the configuration A and the minimum FPOT (5.7 seconds) but exhibits a slight degradation of the non-sheet-feed portion temperature rise. The configuration D as a form of the present (fourth) exemplary embodiment provides an effect of an improvement in the end-portion temperature drop as an equivalent improvement to the third exemplary embodiment, and provides a slight improvement in the non-sheet-feed portion temperature rise in comparison with the third exemplary embodiment as an equivalent temperature rise to the first comparative example. The configuration E as another form of the present (fourth) exemplary embodiment provides an effect of an improvement in the end-portion temperature drop as an equivalent improvement to the third exemplary embodiment, and provides a slight improvement in the non-sheet-feed portion temperature rise in comparison with the third exemplary embodiment as an equivalent temperature rise to the first comparative example.

The effects of the improvement in the end-portion temperature drop have a thermodynamically close correlation with the widthwise length of the aluminum plate 150. However, it is observed that the effects are affected by existence of the aluminum plate 150 on the back surface of the electrically heating resistance layers 113*b*. Since the electrically heating resistance layers 113*b* generate a thermal energy, the heat flow is maximized on the back surface of the electrically heating resistance layers 113*b* in the heat transfer to the aluminum plate 150 via the substrate 113*a*. Accordingly, if the aluminum plate 150 is not disposed on the back surface of the electrically heating resistance layers 113*b*, the heat flux Q2 to the back surface is effectively restricted. Then, the heat flux Q1 on the front side is promoted as a reaction to the restricted heat flux Q2, resulting in the improvement in the end-portion temperature drop.

Accordingly, the shape and arrangement of the aluminum plate 150 at the end positions of the electrically heating resistance layers 113*b* are essential as countermeasures for the end-portion temperature drop. As a result of the above-described evaluations, we found that the end-portion temperature drop is remarkably improved if at least a part of the electrically heating resistance layers 113*b* protrudes from the existence region of the aluminum plate 150 at the end positions of the layers 113*b*. The aluminum plate 150 may be tapered in shape by reducing the aluminum plate 150 from both widthwise sides as illustrated in the configuration A, or tapered by reducing the aluminum plate 150 from only one widthwise side as illustrated in the configuration D. Alternatively, the aluminum plate 150 may be shaped by varying the widthwise length while reducing the longitudinal length as illustrated in the configuration E.

According to the present exemplary embodiment, the results of the evaluations on the configurations D and E are preferable from the viewpoint of the FPOT reduction and the restriction of the non-sheet-feed portion temperature rise. However, the optimum configuration depends on the requirements and tolerances for each performance. For example, the configuration C is desirable if the reduction of the time till discharge (the time until a sheet is discharged in a favorable image condition, or the FPOT) is particularly emphasized. More specifically, if the FPOT reduction is emphasized, the farthest end-portion widthwise length (W_end) of the aluminum plate 150 may be reduced. On the contrary, the configuration B may be selected if the FPOT reduction is not so strictly required.

As described above, changing the shape and arrangement of the aluminum plate 150 enables adjusting the relation between the FPOT reduction and the restriction of the non-sheet-feed portion temperature rise, thus implementing superior product performance in comparison with the configuration of the first comparative example.

Additional Notes

The above-described exemplary embodiments disclose at least the following sheet processing apparatus.

(Item 1)

An image forming apparatus using a fixing apparatus. The fixing apparatus includes a first rotating member, an elongated heater disposed in the internal space of the first rotating member, the heater having an electrically heating resistance layer, a second rotating member in contact with the outer circumferential surface of the first rotating member, and configured to form a nip portion for pinching and conveying a recording material together with the heater via the first rotating member, and a soaking member disposed to be in contact with the heater and configured to uniform a temperature distribution of the heater. At the nip portion, an unfixed image on the recording material is fixed to the recording material. In the heater, the recording material conveyance direction on the plane forming the nip portion is the widthwise direction, and the long side direction perpendicular to the recording material conveyance direction is the longitudinal direction. The soaking member includes a first region having a fixed widthwise length, a second region closer to an end-portion side than the first region, and ranging from an end portion of the first region to a position where an end portion of a maximum size recording material conveyable by the fixing apparatus passes through, and a third region closer to a longitudinal end-portion side than the second region, and ranging from an end portion of the second region to an end portion of the soaking member. The widths of the second and the third regions in the widthwise direction are smaller than the width of the first region in the widthwise direction, and the widths of the second and the third regions in the widthwise direction are the same.

(Item 2)

An image forming apparatus using a fixing apparatus. The fixing apparatus includes a first rotating member, an elongated heater disposed in the internal space of the first rotating member, the heater having an electrically heating resistance layer, a second rotating member in contact with the outer circumferential surface of the first rotating member, and configured to form a nip portion for pinching and conveying a recording material together with the heater via the first rotating member, and a soaking member disposed to be in contact with the heater and configured to uniform a temperature distribution of the heater. At the nip portion, an unfixed image on the recording material is fixed to the recording material. In the heater, the recording material conveyance direction on the plane forming the nip portion is the widthwise direction, and the long side direction perpendicular to the recording material conveyance direction is the longitudinal direction. The soaking member includes a first region having a fixed widthwise length, a second region closer to an end-portion side than the first region, and ranging from an end portion of the first region to a position where an end portion of a maximum size recording material conveyable by the fixing apparatus passes through, and a third region closer to a longitudinal end-portion side than the second region, and ranging from an end portion of the second region to an end portion of the soaking member. The width of the third region in the widthwise direction is smaller than the width of the second region in the widthwise direction, and the width of the second region in the widthwise direction is smaller than the width of the first region in the widthwise direction.

(Item 3)

An image forming apparatus using a fixing apparatus. The fixing apparatus includes a first rotating member, an elongated heater disposed in the internal space of the first rotating member, the heater having an electrically heating resistance layer, a second rotating member in contact with the outer circumferential surface of the first rotating member, and configured to form a nip portion for pinching and conveying a recording material together with the heater via the first rotating member, and a soaking member disposed to be in contact with the heater and configured to uniform a temperature distribution of the heater. At the nip portion, an unfixed image on the recording material is fixed to the recording material. In the heater, the recording material conveyance direction on the plane forming the nip portion is the widthwise direction, and the long side direction perpendicular to the recording material conveyance direction is the longitudinal direction. The soaking member includes a first region having a fixed widthwise length, a second region closer to an end-portion side than the first region, and ranging from an end portion of the first region to a position where an end portion of a maximum size recording material conveyable by the fixing apparatus passes through, and a third region closer to a longitudinal end-portion side than the second region, and ranging from an end portion of the second region to an end portion of the soaking member. The widths of the second and the third regions in the widthwise direction continuously decrease over the range from the second to the third regions.

(Item 4)

The image forming apparatus according to any one of items 1 to 3. The length of the second region in the longitudinal direction is 20 mm or more and 40 mm or less.

(Item 5)

The image forming apparatus according to any one of items 1 to 4. When viewed along a normal direction to a plane formed of the recording material conveyance direction and the longitudinal direction, the electrically heating resistance layer fits into the inside of the soaking member in the first region, and a part of the electrically heating resistance layer protrudes from the soaking member in the third region.

The present disclosure makes it possible to restrict the non-sheet-feed portion temperature rise and reduce the FPOT with an inexpensive and simple configuration in a fixing apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-079031, filed May 12, 2023, which is hereby incorporated by reference herein in its entirety.

What is claimed is:

1. An image forming apparatus comprising:

a fixing apparatus, wherein the fixing apparatus includes:

a first rotating member, a heater that is elongated, is disposed in an internal space of the first rotating member, and includes an electrically heating resistance layer, a second rotating member in contact with an outer circumferential surface of the first rotating member, and configured to form a nip portion for pinching and conveying a recording material together with the heater via the first rotating member, and a soaking member disposed in contact with the heater and configured to make a temperature distribution of the heater uniform, wherein, at the nip portion, an unfixed image on the recording material is to be fixed to the recording material, wherein, in the heater, a recording material conveyance direction on a plane forming the nip portion is a widthwise direction, and a long side direction perpendicular to the recording material conveyance direction is a longitudinal direction, wherein the soaking member includes a first region, a second region, and a third region, wherein the first region has a fixed width in the widthwise direction, wherein the second region is closer to an end-portion side than the first region, and ranges from an end portion of the first region to a position where an end portion of a maximum size recording material conveyable by the fixing apparatus is to pass through, wherein the third region is closer to a longitudinal end-portion side than the second region, and ranges from an end portion of the second region to an end portion of the soaking member, wherein widths of the second and the third regions in the widthwise direction are smaller than the fixed width of the first region in the widthwise direction, and the widths of the second and the third regions in the widthwise direction are equal to each other, and wherein an entirety of the second region in the longitudinal direction and an entirety of the third region in the longitudinal direction have an equal width in the widthwise direction.

2. The image forming apparatus according to claim 1, wherein, when viewed along a normal direction to a plane formed of the recording material conveyance direction and the longitudinal direction, the electrically heating resistance layer fits into an inside of the soaking member in the first region, and a part of the electrically heating resistance layer protrudes from the soaking member in the third region.

3. An image forming apparatus comprising:

a fixing apparatus, wherein the fixing apparatus includes:

a first rotating member, a heater that is elongated, is disposed in an internal space of the first rotating member, and includes an electrically heating resistance layer, a second rotating member in contact with an outer circumferential surface of the first rotating member, and configured to form a nip portion for pinching and conveying a recording material together with the heater via the first rotating member, and a soaking member disposed in contact with the heater and configured to make a temperature distribution of the heater uniform, wherein, at the nip portion, an unfixed image on the recording material is to be fixed to the recording material, wherein, in the heater, a recording material conveyance direction on a plane forming the nip portion is a widthwise direction, and a long side direction perpendicular to the recording material conveyance direction is a longitudinal direction, wherein the soaking member includes a first region, a second region, and a third region, wherein the first region has a fixed width in the widthwise direction, wherein the second region is closer to an end-portion side than the first region, and ranges from an end portion of the first region to a position where an end portion of a maximum size recording material conveyable by the fixing apparatus is to pass through, wherein the third region is closer to a longitudinal end-portion side than the second region, and ranges from an end portion of the second region to an end portion of the soaking member, wherein a width of the third region in the widthwise direction is smaller than a width of the second region in the widthwise direction, and the width of the second region in the widthwise direction is smaller than the fixed width of the first region in the widthwise direction, and wherein the second region has an equal width in the widthwise direction throughout an entirety of the second region in the longitudinal direction, and the third region has an equal width in the widthwise direction throughout an entirety of the third region in the longitudinal direction.

4. The image forming apparatus according to claim 3, wherein a length of the second region in the longitudinal direction is 20 millimeters (mm) or more and 40 mm or less.

5. An image forming apparatus comprising:

a fixing apparatus, wherein the fixing apparatus includes:

a first rotating member, a heater that is elongated, is disposed in an internal space of the first rotating member, and includes an electrically heating resistance layer, a second rotating member in contact with an outer circumferential surface of the first rotating member, and configured to form a nip portion for pinching and conveying a recording material together with the heater via the first rotating member, and a soaking member disposed in contact with the heater and configured to make a temperature distribution of the heater uniform, wherein, at the nip portion, an unfixed image on the recording material is to be fixed to the recording material, wherein, in the heater, a recording material conveyance direction on a plane forming the nip portion is a widthwise direction, and a long side direction perpendicular to the recording material conveyance direction is a longitudinal direction, wherein the soaking member includes a first region, a second region, and a third region, wherein the first region has a fixed width in the widthwise direction, wherein the second region is closer to an end-portion side than the first region, and ranges from an end portion of the first region to a position where an end portion of a maximum size recording material conveyable by the fixing apparatus is to pass through, wherein the third region is closer to a longitudinal end-portion side than the second region, and ranges from an end portion of the second region to an end portion of the soaking member, wherein widths of the second and the third regions in the widthwise direction continuously decrease over a range from the second region to the third region, and wherein, when viewed along a normal direction to a plane formed of the recording material conveyance direction and the longitudinal direction, the electrically heating resistance layer is positioned in an inside of the soaking member in the first region, and a part of the electrically heating resistance layer protrudes from the soaking member in the third region.

* * * * *